Figure 6:
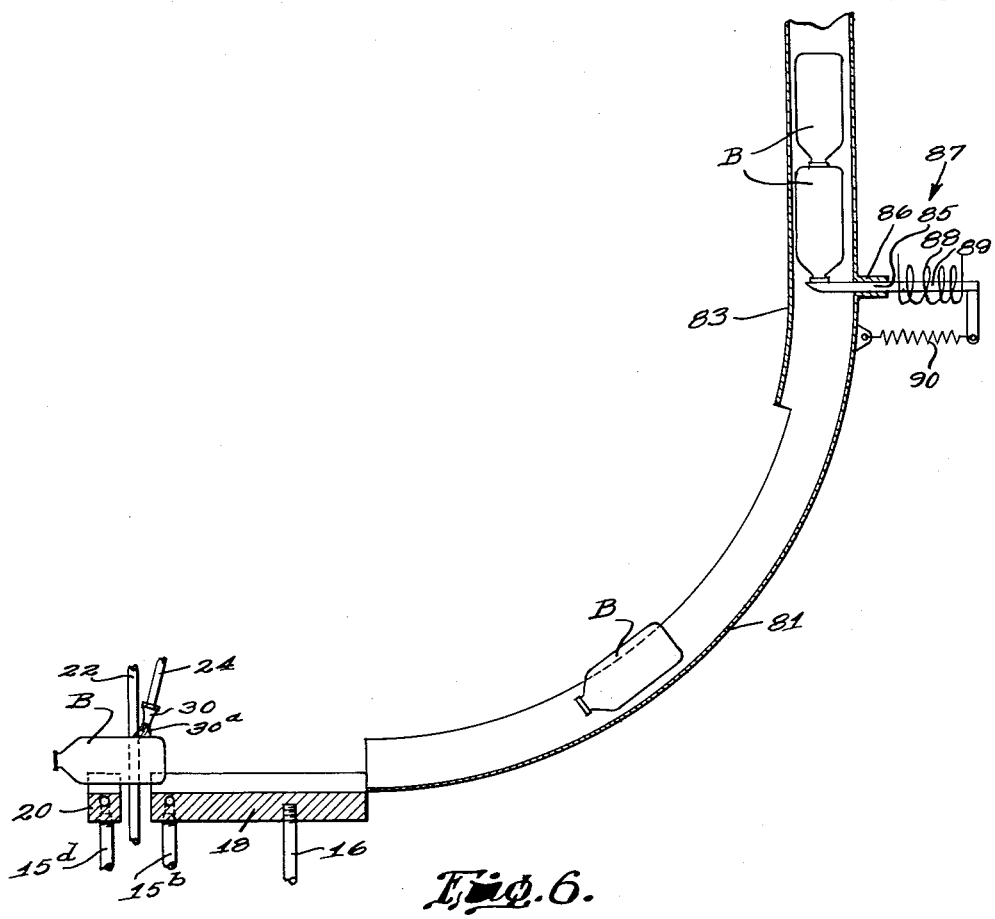

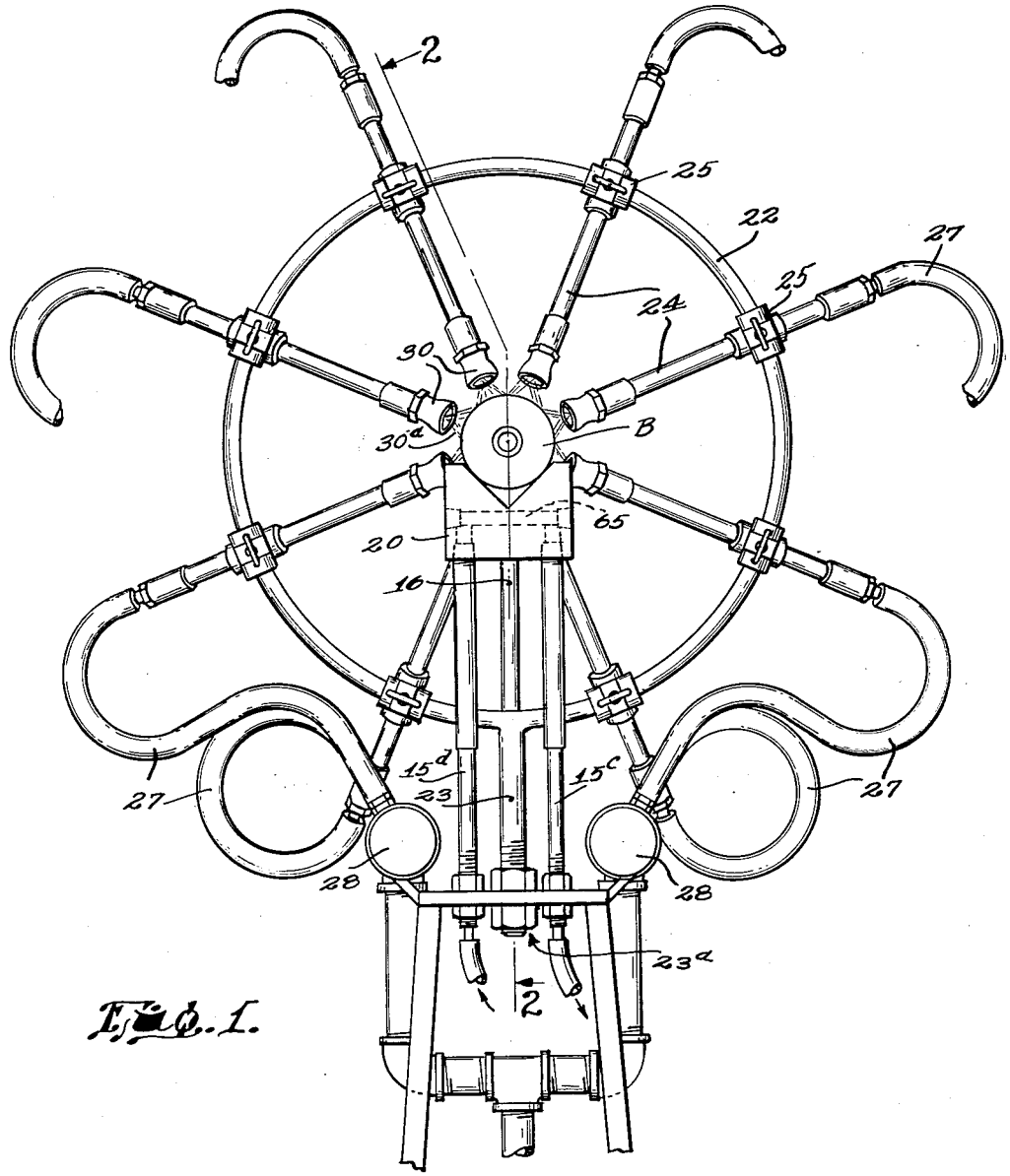

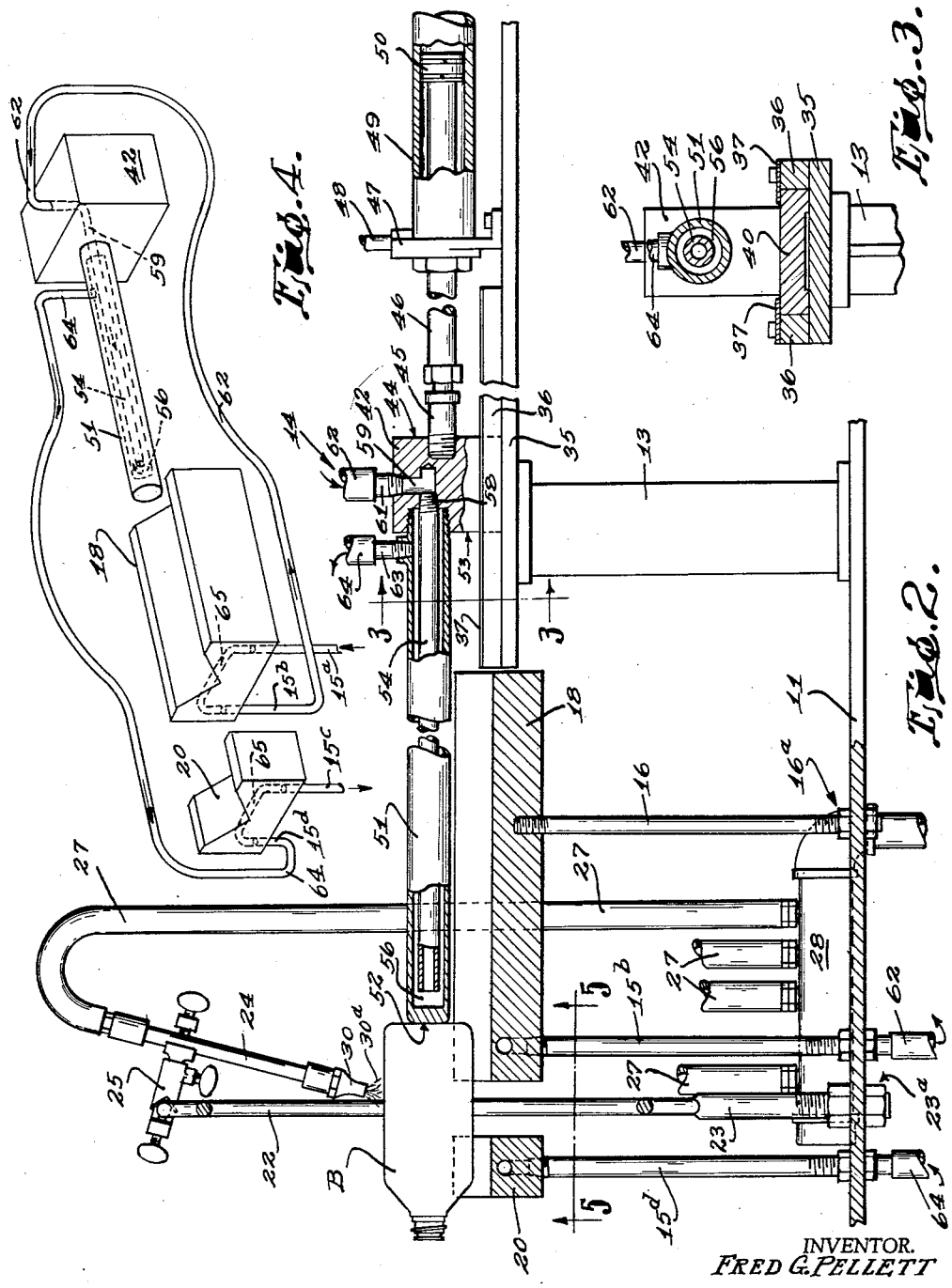

March 20, 1962 F. G. PELLETT 3,026,100
APPARATUS FOR FLAME-TREATING PLASTIC ARTICLES
Filed Dec. 26, 1958 3 Sheets-Sheet 3

INVENTOR.
FRED G. PELLETT
BY
ATTORNEYS

United States Patent Office 3,026,100
Patented Mar. 20, 1962

3,026,100
APPARATUS FOR FLAME-TREATING
PLASTIC ARTICLES
Fred G. Pellett, Maumee, Ohio, assignor to Owens-Illinois Glass Company, a corporation of Ohio
Filed Dec. 26, 1958, Ser. No. 783,067
1 Claim. (Cl. 263—6)

The present invention relates to apparatus of utility in flame-treating plastic articles, and, more specifically, a novel apparatus for subjecting blown articles fabricated from plastic, e.g., polyethylene, polystyrene, and the like, to a uniform zone of flame.

Articles, and particularly blown, hollow containers molded of polyethylene, polystyrene, and similar materials, possess a common characteristic that printing inks will not satisfactorily adhere thereto. In like fashion, pasted labels will not satisfactorily adhere to the surface. As a result, attempts to apply printing, decorations, and labels are largely unsuccessful. It has been reported that the outer surface of articles fabricated of such materials can be enhanced in this respect by subjecting the surface, on which it is desired to deposit a printing ink or label, to a flame. Experience has shown, however, that the flame necessary to desirably accomplish this result is accompanied by a substantial amount of heat, and the design and manufacture of equipment to perform this function is hampered by reason of the fact that the temperature deleteriously affects the materials of construction, and, in addition, it is found that parts of such machinery become so hot that when they are brought into contact with the plastic article, they mar the surface and otherwise damage the article so that the appearance and even the physical properties of the container are adversely affected.

Previous apparatus for flame-treating plastic articles have been designed to provide for dropping the articles vertically through a zone of flame formed for instance by a plurality of radially disposed burners aimed to define the zone therebetween. This has proved disadvantageous because the localized flame creates so much heat that, as it rises, a chimney effect is produced with the result that the plastic containers positioned thereabove are subjected to too much heat leading to possible softening and deterioration thereof and in addition such is hazardous to personnel in attendance.

Accordingly, it is a principal object of the present invention to provide a novel apparatus in the nature of an article-handling apparatus which is adapted to continuously and sequentially receive individual plastic articles and deliver them through a zone of flame arranged to impinge uniformly about the periphery of the article to be treated, and receive the articles thereafter.

It is another object of the present invention to provide such apparatus which includes a novel internal cooling arrangement for those parts which are adjacent the zone of flame, and which necessarily come into contact with the article in the handling and delivery thereof.

It is likewise an object of the present invention to provide apparatus which utilizes a burner arrangement which materially reduces the amount of heat rising from the apparatus by dissipating the heat in a lateral direction.

The foregoing and other objects of this invention will become apparent to those skilled in the art by reference to the attached drawings, on which there is presented for purposes of illustration only, a preferred embodiment of the apparatus of the invention.

Figure 5:
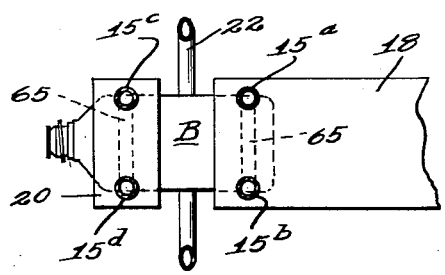

In the drawings:
FIG. 1 is a vertical end-on view looking at the end of the apparatus.
FIG. 2 is a sectional view taken on the line 2—2 of FIG. 1.
FIG. 3 is a sectional view taken on the line 3—3 of FIG. 2.
FIG. 4 is a schematic view showing the manner in which the principal article-contacting elements are water-cooled.
FIG. 5 is a sectional view taken on the line 5—5 of FIG. 2.
FIG. 6 is a side elevation illustrating another embodiment of the apparatus, specifically for feeding the articles.

Basically, the apparatus includes feed and delivery troughs in horizontally spaced, aligned relationship, means for providing a concentrated, uniform zone of flame intermediate said troughs, and reciprocating means for delivering articles through the flame in individual sequence. In one embodiment, this takes the form of a reciprocatingly actuated piston beyond the rear end of said feed trough, and connected thereto, a fluid-cooled, elongated pusher bar member constructed and arranged to contact an article placed in the feed trough and direct same through the zone of flame to the delivery trough.

Referring now more specifically to the drawings, there is shown in FIGS. 1 and 2 the apparatus of the invention. A table 11 serves as a base for the components of the apparatus. A vertical pedestal 13 rests on the table 11 and supports a pusher bar assembly 14. A solid vertical support rod 16 which is height adjustable as at 16ª, and a pair of spaced hollow tubes 15ª and 15ᵇ, similarly height adjustable, support a horizontally disposed, V-shaped feed trough 18. In similar fashion, hollow tubes 15ᶜ and 15ᵈ support, in alignment with the feed trough 18, a V-shaped receiving trough 20. The V-shaped troughs provide an article retaining surface for the articles shown in the drawings to be a polyethylene container B and confine movement thereof to axial movement. In the space between the troughs 18 and 20, there is positioned a ring-like support member 22. The plane of the ring is in vertical relationship to the support or guide elements 18 and 20. The ring is connected to a support rod 23 adjustably connected as at 23ª to the table 11. Equally spaced about the ring 22 are a plurality of inwardly directed burners 24, held to the ring by adjustable brackets 25. The outer ends of the burners are connected by a flexible conduit 27 to a manifold 28 for a combustible mixture of gas and air supplied under pressure. The burners are preferably inclined, as shown particularly in FIG. 2. The inclination is such that the burner end 30 of the burners is inclined in the direction of the path of travel of the articles to be treated by the apparatus. More particularly, the axis of the burners, as shown, defines an angle of 75° with respect to the horizontal alignment of the trough members.

The pusher bar assembly 14 on the pedestal 13 includes a horizontally disposed linear table 35, generally in alignment with the trough members and bearing at each upper edge, a pair of guide rails 36. Each guide rail has mounted to its upper surface a retaining plate 37 which projects slightly inward beyond the inner edge of the respective guide rails. There is thus defined a confined, sliding passageway for the channel-shaped base 40 of connecting block 42. The rearmost end 44 of the block 42 is adjustably connected through rods 45 and 46, through a support plate 47, bracketed to the table 11, to a double action, reciprocating, fluid-actuated cylinder 49. The cylinder 49 may be either hydraulically or pneumatically powered and is governed by any convenient arrangement to effect reciprocating movement of the block 42 in the direction of the delivery trough. Conduit 48 supplies pressure to the cylinder on one side of the piston 50 to force it to the right as viewed in FIG. 2. A similar connection at the other end (not shown) forces the piston 50 to the left. A linear rod 51 is screwed into the forward face 53 of the block 42 and is located so that as the block reciprocates in response to actuation of the cylinder piston 49, 50, it will pass down the V-shaped trough until the end 52 projects into the flame 30ª and then returns to a position remote therefrom. The rod member 51 is hollow, and includes an inner, open-ended tube 54 of smaller diameter to define, between the walls thereof, an annular passageway 56. The inner tube 54 connects to the block 42 at 58 and communicates with a passageway 59 formed by drilling holes in the block 42. One of the drilled holes extends from the upper surface of the block and connects through a hollow tube 61 to a flexible conduit 62. The hollow tube 51, in similar fashion, contains a drilled hole normal thereto adjacent the block 42, which connects the passageway 56 through a similar conduit 63 to a flexible conduit 64. Returning now for a moment to the trough members 18 and 20, each contains an internal passageway 65 (shown in dotted lines in FIG. 1 for the trough 20). The passageway is normal to the axis of the trough, and connects at each end with the hollow support posts 15ᶜ and 15ᵈ for the trough 20 and the pair of hollow support posts 15ᵃ and 15ᵇ for the trough 18. The bottom-most ends of these hollow support posts are connected so that support post 15ᵇ connects with flexible hose 62 leading into the block 42 while support post 15ᵈ connects to flexible conduit 64.

The fluid flow in these members is best seen by reference to FIG. 4, wherein for ease of understanding, the same reference numerals have been used as in the foregoing description. Thus, it can be seen that efficient, internal water-cooling of the principal components of the apparatus of the invention can be achieved by using hollow post 15ᵃ as a water inlet. The water will then proceed up pipe 15ᵃ into the end of the trough 18 adjacent the zone of flame, across an internal passageway 65, thence down out of the block through pipe 15ᵇ into a conduit 62, thence into the guide block 42 through the passageway 59 therein, out and down the length of the hollow tube 54, out the end thereof, and in reverse direction through the passageway 56, thence up and out the conduit 64, thence up pipe 15ᵈ into the trough 20, horizontally across through-passageway 65, and down pipe 15ᶜ and out to waste.

In operation, the articles in this case, a bottle B fabricated of polyethylene is placed by any convenient scheme, e.g., either by hand or by magazine delivery in the trough 18. The opening or mouth of the bottle is located as shown so that the pusher bar 51 in its reciprocatory travel will contact the base and propel the plastic container along the length of the trough 18, across the gap between the trough 18 and 20, and, consequently, through the zone of flame onto the receiving trough 20 and beyond, so that the container drops into any convenient receiver. As can be seen, the three parts which come into close proximity with the high temperature accompanying the flame, and which, in fact, have the flame actually impinging on their surfaces, are water-cooled as described hereinabove so that the heat of the flame may be continuously dissipated. In this fashion, the temperature of the article-contacting surfaces of these components is maintained below the softening point of the material of which the article is fabricated, and, accordingly, no surface mars, scratches, scars, or defects result.

Referring now to FIG. 6, it will be seen that there may be used, instead of the pusher bar assembly 14, a curvilinear gravity feed chute 81 which meshes smoothly with the V-shaped feed trough 18, and is connected at the other end to a magazine 83 containing as shown a plurality of plastic containers B in inverted position. The particular arrangement of the bottles is of course not critical as they can be placed in a position inverted to that shown. The delivery of containers from the magazine may be simply controlled by a laterally reciprocable gate member 85 mounted slidably in journal 86 at the base of magazine 83. Any convenient arrangement may be used to move the gate member and in fact can be hand operated if desired. In the drawings, reciprocation has been shown to be effected by a spring-loaded electromagnet 87 including a current carrying coil 88, a soft iron rod 89 (connected to the gate member 85) and a spring 90. Any conventional electrical timing device may be used to direct current to the coil to energize the coil to move the gate member against the spring which normally urges the gate member into stop position. It will be appreciated that the movement of the gate member 85 out of the magazine will cause a single container to fall from the magazine down into the chute and thence to the trough 18 through the concentrated zone of flame to the receiving trough 20. The gate member is most conveniently controlled by the spring so that it moves back into the magazine and catches the next container in readiness for release in the desired timed sequence. Any other equivalent may, of course, be substituted for the spring. The height of the magazine above the plane of the troughs 18 and 20 is adjusted to effect the desired rate of speed of the containers through the zone of flame according to the weight of the particular types of containers or articles being treated. Thus a lighter weight article will require more vertical fall to give it the necessary inertia. On the other hand, a heavier article will require less magazine elevation to impart sufficient inertia. It will be appreciated that for the foregoing reasons the utilization of the pusher bar assembly is preferred to the chute delivery scheme described. Thus, the pusher bar assembly permits a controlled rate of lateral speed which is independent of the weight and shape of the article to be treated.

Preferably, the burners 24 should be located so that the articles in passing are spaced from about ¼″ to 1″ from the end of the blue cone in the flame. The flame temperature is largely empirical, although the flame may be generally described as an oxidizing flame controlled to have a sharply defined cone having a color of from blue to blue-violet. Generally, this is achieved by a rather lean mixture of gas to air. There are many commercial types of apparatus which may be used to mix the gas and the air, as such is generally well known in the art. In this particular apparatus, there has been used a venturi-type mixer in which air is the aspirating medium to draw combustible gas into the stream. With the type of flame described, it has been found that a satisfactory treatment can be imparted to the surface of the plastic container if the linear speed of the pusher bar is controlled to measure 2½ ft. per second. Thus, it can be seen that a bottle measuring about one ft. high will be propelled through the zone of flame in about 4/10 second.

It will be appreciated, however, that the flame and the speed of the apparatus may be varied widely, depending upon the material to be treated. In the case of a container, fabricated from polyethylene, simply dipping in a supply of water will indicate whether or not the treatment has been sufficient. Thus if when the container is removed, water is adhering to the surface, the bottle will print well, while if it is still dry, then it will not print.

Various changes and modifications may be resorted to within the spirit and scope of the invention.

I claim:

Apparatus for flame-treating the exterior surfaces of plastic bottles and the like articles comprising a pair of first and second elongated channel-shaped bottle guides having open upper sides and arranged in end-to-end relationship with adjacent ends spaced apart longitudinally, the first guide adapted to initially support bottles to be flame-treated in recumbent positions therein, the space between adjacent ends of the guides being less than the length of the bottles placed upon said first guide, flame forming means for projecting a localized sheet of flame across the space between the ends of said guides in a direction transverse to the axis of advancing bottles, said guide having passages for cooling water adjacent said flame forming means, means engageable with an end of the bottles for advancing bottles placed upon the first guide through the sheet of flame onto and beyond the second guide, said last means including a fluid-actuated, reciprocating member disposed above and generally parallel to said guides, and a pusher bar connected thereto for engaging and advancing bottles on one of said guides and through said flame to the other of said guides, said pusher bar including an internal passageway for cooling water and means interconnecting said last named passageway with the passageways in said guides.

References Cited in the file of this patent

UNITED STATES PATENTS

| | | |
|---|---|---|
| 1,649,926 | Ruckstahl et al. | Nov. 22, 1927 |
| 2,058,388 | Rendleman | Oct. 20, 1936 |
| 2,237,659 | Edwards | Apr. 8, 1941 |
| 2,412,758 | Smith | Dec. 17, 1946 |
| 2,558,005 | Sciaky | June 26, 1951 |
| 2,603,470 | Hess | July 15, 1952 |
| 2,652,240 | Nesbitt | Sept. 15, 1953 |